(12) United States Patent
Wang et al.

(10) Patent No.: US 12,385,827 B2
(45) Date of Patent: Aug. 12, 2025

(54) TIME-RESOLVED SPECTRUM RAPID MEASUREMENT SYSTEM AND METHOD

(71) Applicant: GBA BRANCH OF AEROSPACE INFORMATION RESEARCH INSTITUTE, CHINESE ACADEMY OF SCIENCES, Guangdong (CN)

(72) Inventors: Zhenyou Wang, Guangzhou (CN); Bi-Xiao Wang, Guangzhou (CN); Mengyao Guo, Guangzhou (CN); Guangyou Fang, Guangzhou (CN)

( * ) Notice: Subject to any disclaimer, the term of this patent is extended or adjusted under 35 U.S.C. 154(b) by 0 days.

(21) Appl. No.: 18/864,531

(22) PCT Filed: Jun. 1, 2023

(86) PCT No.: PCT/CN2023/097701
§ 371 (c)(1),
(2) Date: Nov. 10, 2024

(87) PCT Pub. No.: WO2024/221539
PCT Pub. Date: Oct. 31, 2024

(65) Prior Publication Data
US 2025/0172489 A1   May 29, 2025

(30) Foreign Application Priority Data
Apr. 23, 2023 (CN) .......................... 202310436246.2

(51) Int. Cl.
*G01J 3/28* (2006.01)
*G01N 21/25* (2006.01)
(Continued)

(52) U.S. Cl.
CPC .......... *G01N 21/255* (2013.01); *G01N 21/27* (2013.01); *G01N 2021/1791* (2013.01); *G01N 2201/0668* (2013.01)

(58) Field of Classification Search
CPC ...... G01J 3/02; G01J 3/44; G01J 3/28; G01N 21/255; G01N 21/27; G01N 2021/1791; G01N 2201/0668
See application file for complete search history.

(56) References Cited

U.S. PATENT DOCUMENTS 5,010,346 A * 4/1991 Hamilton ................. G02F 7/00
                                                                  250/227.12
8,089,625 B2 * 1/2012 Marcu ................ G01N 21/6486
                                                                  356/318
(Continued)

FOREIGN PATENT DOCUMENTS

CN       102590159          7/2012
CN       104054266          9/2014
(Continued)

OTHER PUBLICATIONS

Jiang et al, "A multi-order method for predicting stability of a multi-delay milling system considering helix angle and run-out effects", Chinese Journal of Aeronautics, (2018), 31(6): 1375-1387, Available online: Aug. 30, 2017 (Aug. 30, 2017).
(Continued)

*Primary Examiner* — Abdullahi Nur
(74) *Attorney, Agent, or Firm* — JMB DAVIS BEN-DAVID

(57) ABSTRACT

Disclosed is a time-resolved spectrum rapid measurement system and method, the system including a pulse laser module, a sample stage module, a control computer module, a detector module, a spectrometer module, and a multi-path delay module. The multi-path delay module is configured to split the signal light produced by the samples in the sample stage module to form a plurality of optical paths; add a different optical distance in each optical path to extend the time for the signal light produced by the samples to reach a detector; and make the time for the signal light in each (Continued)

optical path to reach the detector different, to realize multi-path delay. By providing a multi-path delay module in the system, the present disclosure can measure the spectra of a plurality of delay windows in parallel, improving the measurement speed of time-resolved spectra while reducing the measurement error.

9 Claims, 2 Drawing Sheets

(51) Int. Cl.
*G01N 21/27* (2006.01)
*G01N 21/17* (2006.01)

(56) References Cited

U.S. PATENT DOCUMENTS

| | | | |
|---|---|---|---|
| 9,964,396 B1* | 5/2018 | Scott | G01B 9/02051 |
| 11,592,680 B2* | 2/2023 | Kurki | G01J 3/2803 |
| 2002/0158211 A1* | 10/2002 | Gillispie | G01J 3/4406 |
| | | | 250/458.1 |
| 2014/0253713 A1 | 9/2014 | Zhai | |
| 2017/0284940 A1 | 10/2017 | Butte | |
| 2019/0204577 A1* | 7/2019 | Faris | G02B 21/0088 |
| 2020/0003618 A1* | 1/2020 | Fujita | G01N 21/27 |
| 2022/0221730 A1* | 7/2022 | Kurki | G02B 27/141 |
| 2022/0373392 A1 | 11/2022 | Kurki | |

FOREIGN PATENT DOCUMENTS

| | | |
|---|---|---|
| CN | 208091571 | 11/2018 |
| CN | 111504978 | 8/2020 |
| CN | 111750989 | 10/2020 |
| CN | 113932922 | 1/2022 |
| CN | 114460061 | 5/2022 |
| CN | 115046987 | 9/2022 |
| CN | 115077701 | 9/2022 |
| CN | 115165101 | 10/2022 |
| CN | 116148227 | 5/2023 |
| JP | 2004294105 | 10/2004 |
| JP | 2012132741 | 7/2012 |
| JP | 2019536059 | 12/2019 |
| WO | 2021228187 | 11/2021 |

OTHER PUBLICATIONS

Zhang et al, "Time-Resolved XEOL Experiment System on BL14W1 at SSRF", Spectroscopy and Spectral Analysis, vol. 35, pp. 2324-2328, Aug. 2015.

Cheng et al, "Measurement of Time-Dependent Spectra Excited by Pulse Laser Using Multi-Fiber Delayer and Optical Multi-Channel Analyzer", Spectroscopy and Spectral Analysis, vol. 26, pp. 593-596, Apr. 2006.

Xu et al, "Multiple Fiber Slits for Subpixel Spectral Sampling and Reconstruction", Optical Technique, vol. 34, No. 2, pp. 1-3, Mar. 2008.

* cited by examiner

TIME-RESOLVED SPECTRUM RAPID MEASUREMENT SYSTEM AND METHOD

CROSS-REFERENCE TO RELATED APPLICATIONS

This is the U.S. National Stage of International Patent Application No. PCT/CN2023/097701 filed Jun. 1, 2023, which claims priority to Chinese Patent Application No. 202310436246.2 filed Apr. 23, 2023.

FIELD OF THE INVENTION

The present disclosure relates to the field of time-resolved spectrum measurement, and in particular to a time-resolved spectrum rapid measurement system and method.

BACKGROUND OF THE INVENTION

As a method for studying properties of substances through their interaction with electromagnetic waves, spectroscopy is not only a general basic scientific research method, but also a practical application tool, which is widely used in environmental detection, industrial testing, clinical medicine, earth detection, and other fields. To study the dynamic process of the substances, pulse lasers can be used to obtain time-resolved spectra. Time-resolved spectra are important in many applications, for example, time-resolved fluorescence spectra can be used to calculate the fluorescence lifetimes of the substances, and time-resolved Raman spectra are effective in suppressing fluorescence.

The main technologies for realizing time-resolved spectrum measurement are gating and time-correlated single photon counting (TCSPC). The implementation of gating technology includes optical forms, such optical switches as the Kerr cell and Pockels cell, and electrical form, in which selection of signal light is realized by inputting gating electrical signals to a detector. TCSPC technology measures the time difference between a photon detection event and a laser pulse synchronization and builds a histogram of photon arrival times from successive excitation-collection cycles.

TCSPC technology is based on the principle that after the excitation of pulses, the probability of detecting a single photon at a certain time is proportional to the intensity of the signal light at this time. If there are two or more photons in a cycle, the detector only detects the first photon and ignores the other photons, which is the pile-up problem of TCSPC technology and eventually causes histogram anamorphose. It is therefore desirable to reduce the intensity of the incident light to ensure that the degree of anamorphose is within a tolerable range.

The widths of time-gated windows of the detector in gating technology are fixed values set by hardware or software, so it is necessary to measure different delay windows many times to obtain complete photon time domain distribution. At present, different delay windows adopt a time-sharing measurement mode, namely, the detector only measures the spectrum of a single fixed delay window at a time, resulting in long spectrum acquisition time and large measurement error.

The acquisition speed and measurement error of time-resolved spectra are important parameters. As shown in FIG. 1, in a time-resolved spectrum measurement system based on gating technology, a delayer moves the time-gated windows of the detector with the fixed width to different delay windows. To obtain complete time-resolved spectra, it is necessary to measure different delay windows many times, which reduces the acquisition speed of the time-resolved spectra and can not obtain the spectra quickly. Moreover, each delay window is measured at a different time, increasing the measurement error.

SUMMARY OF THE INVENTION

To solve the problems of slow acquisition speed and large measurement error of time-resolved spectrum based on gating technology, the present disclosure provides a time-resolved spectrum rapid measurement system and method. The system can measure the spectra of a plurality of delay windows in parallel by setting multi-path delay modules, thereby improving the measurement speed of time-resolved spectra and reducing the measurement error.

A first object of the present disclosure is to provide a time-resolved spectrum rapid measurement system.

A second object of the present disclosure is to provide a time-resolved spectrum rapid measurement method.

The first object of the present disclosure can be achieved by adopting the following technical solutions:

A time-resolved spectrum rapid measurement system includes:
  a pulse laser module, configured to emit pulse laser;
  a sample stage module, configured to focus the pulse laser on samples, then collect signal light produced by the samples, and filter out excitation light;
  a multi-path delay module, configured to split the signal light produced by the samples to form a plurality of optical paths; add a different optical distance in each optical path to extend the time for the signal light produced by the samples to reach a detector; and make the time for the signal light in each optical path to reach the detector different, to realize multi-path delay;
  a spectrometer module, configured to spatially distinguish signal light of different wavelengths in each optical path;
  a detector module, configured to detect spatially distinguished signal light of the plurality of optical paths in parallel; and
  a control computer module, configured to collect, store, and process the detected signal light of the plurality of optical paths to obtain time-resolved spectra, the control computer module being connected to the detector module via a data cable.

Furthermore, performance indexes of the pulse laser are as follows:
  a wavelength range is 200 to 3000 nm, a linewidth range is 0.001 to 10000 cm$^{-1}$, a pulse width range is 10 fs to 100 ns, a repetition frequency range is 0.1 Hz to 1 GHz, and an average power range is 1 µW to 100 W.

Further, adding the optical distances in the optical paths includes, but is not limited to, the use of fiber delay or free-space optical (FSO) delay; and
  modes for splitting the signal light include, but are not limited to, the use of fiber beam splitters or wavelength-division multiplexers.

Further, the time for the signal light produced by the samples to reach the detector is in an extended range of 1 ps to 1 ms.

Furthermore, if the pulse laser has a function of outputting synchronous electrical signals, the synchronous electrical signals directly trigger the detector; otherwise, the laser is split into two beams, one beam generates synchronous electrical signals for time synchronization via a photoelectric detector, and the other beam is used for sample excitation.

The second object of the present disclosure can be achieved by adopting the following technical solutions:

A time-resolved spectrum rapid measurement method includes:

focusing pulse laser emitted by a pulse laser module on a sample stage module;

collecting, according to the pulse laser, signal light through the sample stage module, and filtering out excitation light;

splitting, through a multi-path delay module, signal light produced by samples to form a plurality of optical paths; adding a different optical distance in each optical path to extend the time for the signal light produced by the samples to reach a detector; and making the time for the signal light in each optical path to reach the detector different, to realize multi-path delay;

spatially distinguishing, through a spectrometer module, signal light of different wavelengths in each optical path;

detecting, through a pixel array in a detector module, distinguished signal light of the plurality of optical paths in parallel; and collecting, storing, and processing, through a control computer module, the detected signal light of the plurality of optical paths to obtain time-resolved spectra.

Furthermore, performance indexes of the pulse laser are as follows:

a wavelength range is 200 to 3000 nm, a linewidth range is 0.001 to 10000 $cm^{-1}$, a pulse width range is 10 fs to 100 ns, a repetition frequency range is 0.1 Hz to 1 GHz, and an average power range is 1 µW to 100 W.

Furthermore, the multi-path delay module is connected to slits in the spectrometer module, each line corresponds to a different position of the slits, and each line is in an interval range of 1 µm to 50 mm; and slit-passed signal light in all the lines spatially distinguishes the signal light of different wavelengths in each line via a same grating.

Furthermore, the signal light of different wavelengths in each line produced by the grating is detected by a pixel array of a same horizontal/vertical position of the detector module, and an interval distance of each line on the detector module is proportional to an interval distance of each line on the slits.

Further, the time for the signal light produced by the samples to reach the detector is in an extended range of 1 ps to 1 ms.

The present disclosure has the following beneficial effects concerning the prior art:

The present disclosure provides a time-resolved spectrum rapid measurement system and method. The system can measure the spectra of a plurality of delay windows in parallel by setting multi-path delay modules, thereby improving the measurement speed of time-resolved spectra and reducing the measurement error. The test process of the system is simplified, which lays a good foundation for the follow-up work and can be widely popularized and applied.

BRIEF DESCRIPTION OF THE DRAWINGS

To explain the embodiments of the present disclosure or the technical solutions in the prior art more clearly, a brief description will be given below concerning the drawings used in the description of the embodiments or the prior art. It is obvious that the drawings in the description below are merely some embodiments of the present disclosure, and those ordinarily skilled in the art would have been able to obtain other drawings according to the structures shown in these drawings without involving any creative effort.

DETAILED DESCRIPTION OF THE EMBODIMENTS

To make the objects, technical solutions, and advantages of the embodiments of the present disclosure more apparent, the technical solutions in the embodiments of the present disclosure will be clearly and completely described below in conjunction with the drawings in the embodiments of the present disclosure. Obviously, the described embodiments are only a part of the embodiments of the present disclosure, and not all of the embodiments. Based on the embodiments in the present disclosure, all other embodiments obtained by the ordinarily skilled in the art without making creative labor fall within the scope of protection of the present disclosure. It should be understood that the specific embodiments described are illustrative only and are not restrictive for the present disclosure.

Embodiment 1

Figure 1:
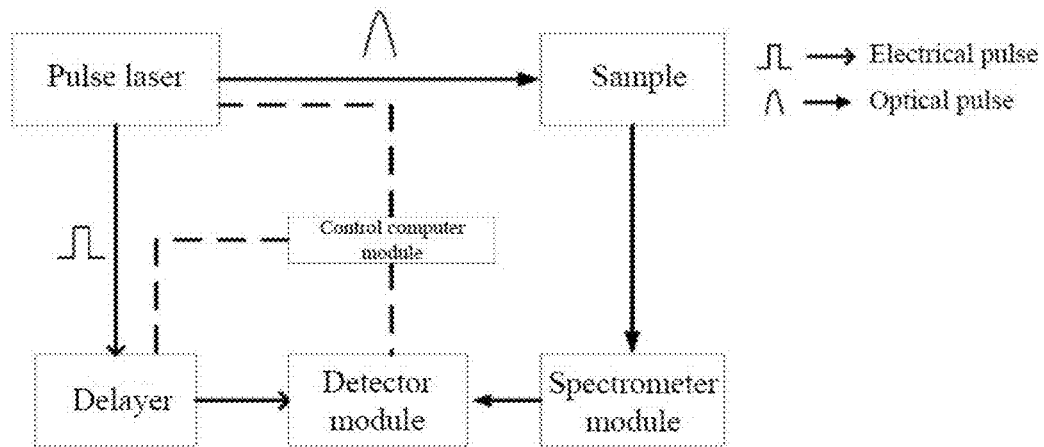
FIG. 1 is a block diagram of a time-resolved spectrum measurement system based on gating technology according to the present disclosure.
Figure 2:
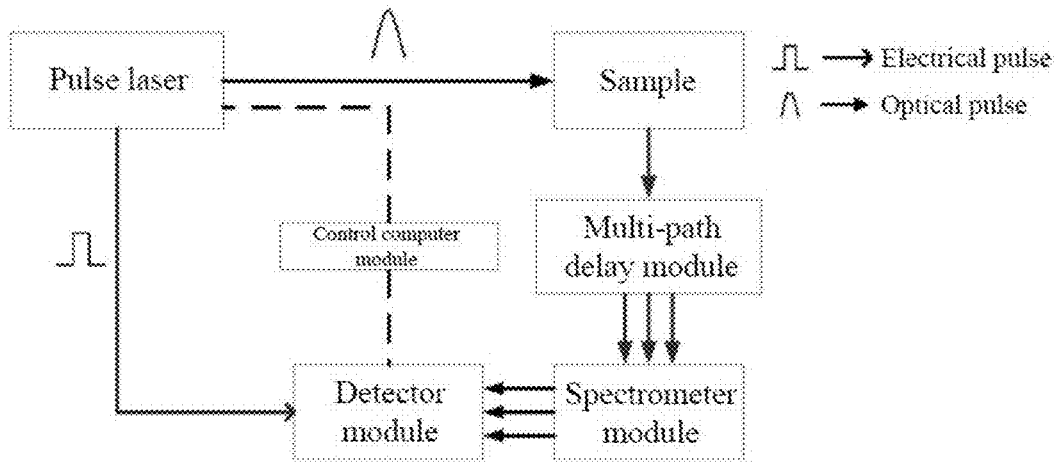
FIG. 2 is a block diagram of a time-resolved spectrum rapid measurement system according to Embodiment 1 of the present disclosure.

As shown in FIG. 2, the time-resolved spectrum rapid measurement system provided in the embodiment eliminates the delayer module and adds multi-path delay modules in the original system (FIG. 1). The time-resolved spectrum rapid measurement system is suitable for the measurement of time-resolved fluorescence spectra, Raman spectra, anti-Stokes spectra, stimulated Raman spectra, absorption spectra, laser-induced breakdown spectra, and other time-resolved spectra.

The system includes six modules, namely, a pulse laser module, a sample stage module, a control computer module, a detector module, a spectrometer module, and a multi-path delay module.

(1) Pulse Laser Module

The module is configured to emit pulse laser and includes components such as a power supply, a laser driver, and a laser head; the power supply is configured to power the laser driver, and the laser driver is configured to control the laser head to emit pulse laser. These components may be distributed or integrated.

Specifically, the key performance indexes of laser in one embodiment are as follows:

wavelength range: 200 to 3000 nm;
linewidth range: 0.001 to 10000 $cm^{-1}$;
pulse width range: 10 fs to 100 ns;
repetition frequency range: 0.1 Hz to 1 GHz;
average power range: 1 µW to 100 W.

Laser has or does not have a function of outputting synchronous electrical signals. If the laser has the function of outputting synchronous electrical signals, the synchronous electrical signals can directly trigger the detector. If the laser has the function of outputting synchronous electrical signals, the laser is split into two beams, one beam generates synchronous electrical signals for time synchronization via a photoelectric detector, and the other beam is used for sample excitation.

(2) Sample Stage Module

The module is configured to carry the samples such that the samples are at the focal position of the pulse excitation light. The sample stage module may be controlled by a multidimensional manual or stepper motor. The laser emitted by the pulse laser module is focused on the samples through various optical devices, then the signal light (such as scattered light, and emitted light) produced by the samples is collected by the optical devices, and the excitation light is filtered out, and finally sent to the multi-path delay module. There are various focusing and collecting optical paths, including but not limited to fiber detectors, microscopic detectors, and confocal microscopic detectors.

(3) Control Computer Module

The module is configured to control various hardware systems and collect and analyze data.

In one embodiment, the control computer module is connected to the pulse laser module via a data cable.

In another embodiment, the control computer module and the pulse laser module are independent of each other and are individually controlled.

(4) Detector Module

The detector module is configured to acquire spectra. There are various options for the detector of the module, such a 2-dimensional pixel panel array detector as intensified charge-coupled device (ICCD) camera and single photon avalanche diode (SPAD) array.

The detector module is connected to the control computer module via the data cable.

(5) Spectrometer Module

The module is configured to spatially distinguish signal light of different wavelengths mainly through a light-splitting optical module including a transmissive or reflective grating, or a prism.

(6) Multi-Path Delay Module

The module is configured to split the signal light produced by the samples to form a plurality of optical paths; add a different optical distance in each optical path to extend the time for the signal light produced by the samples to reach a detector; and make the time for the signal light in each optical path to reach the detector different, to realize multi-path delay. By acquiring a plurality of delay spectra in one data acquisition process of a high-speed photoelectric panel array detector (such as SPAD array and ICCD), the acquisition speed of time-resolved spectra is improved and the measurement error is reduced.

There are various kinds of optical paths adding optical distances, such as fiber delay and free space optical delay. There are various ways of beam splitting, such as fiber beam splitters and wavelength-division multiplexers.

Figure 3:
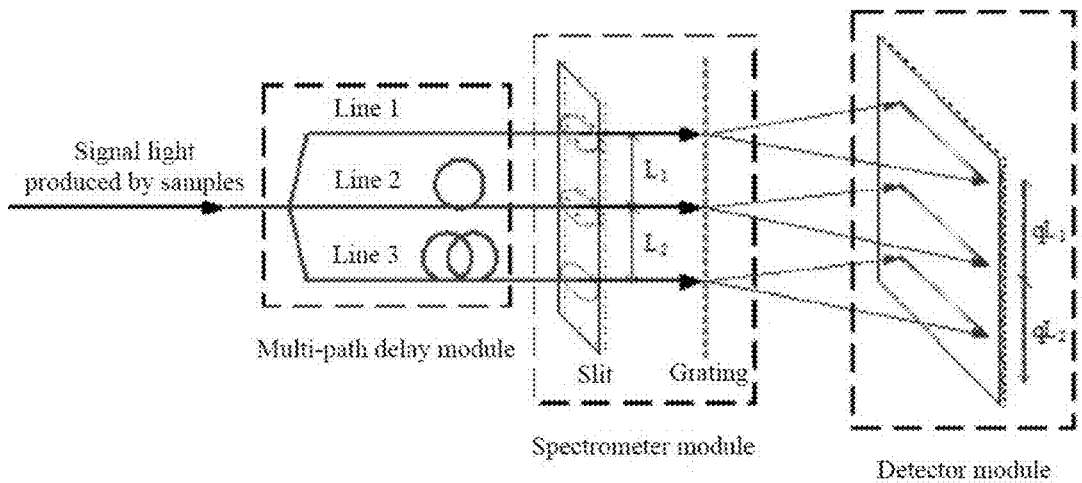
FIG. 3 is a multi-path delay diagram based on fiber delay and fiber beam splitters according to Embodiment 1 of the present disclosure.
Figure 4:
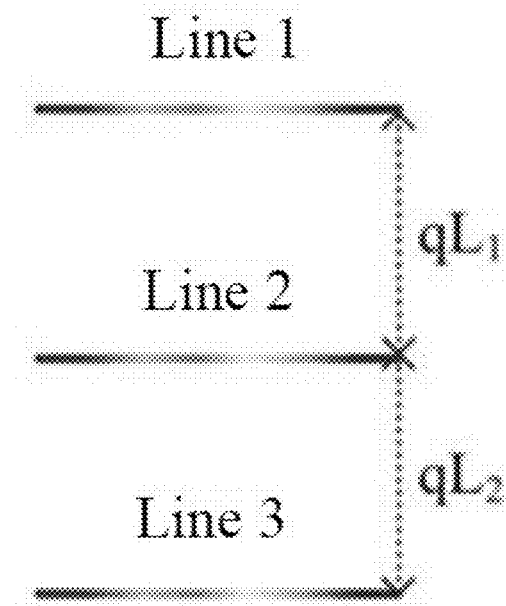
FIG. 4 is a diagram of a detector module detecting signal light of three lines in parallel according to Embodiment 1 of the present disclosure.

Specifically, taking the fiber delay and fiber beam splitters as examples, the signal light produced by the samples enters the spectrometer through the fiber beam splitters. The type of fiber is not limited as long as the delay requirement is met. The splitting ratio of the fiber beam splitter is not limited, and the splitting ratios of each line may be equal or unequal, and the splitting ratios of n lines are $a_1, a_2, \ldots,$ and $a_n$. Taking the fiber beam splitter with $a_1=a_2=a_3=\frac{1}{3}$ as an example, as shown in FIGS. 3 and 4, fibers of different lengths are added to line 2 and line 3, and the time delay ranges from 1 ps to 1 ms. The multi-path delay module is connected to slits in the spectrometer module, each line corresponds to a different position of the slits, and the interval distances are $L_1, L_2, \ldots,$ and $L_{n-1}$, which may be equal or unequal, and the interval range is 1 µm to 50 mm. The three signal light passing through the slit spatially distinguish the signal light of different wavelengths through the same grating. slit-passed signal light of three lines spatially distinguishes the signal light of different wavelengths via a same grating. Finally, the detector module detects the signal light of three lines in parallel. The interval distance of each line on the detector is $qL_1, qL_2, \ldots,$ and $qL_{n-1}$, and the coefficient q is determined by the optical path and optical device in the spectrometer module, and the distance between the spectrometer module and the detector module.

Figure 5:
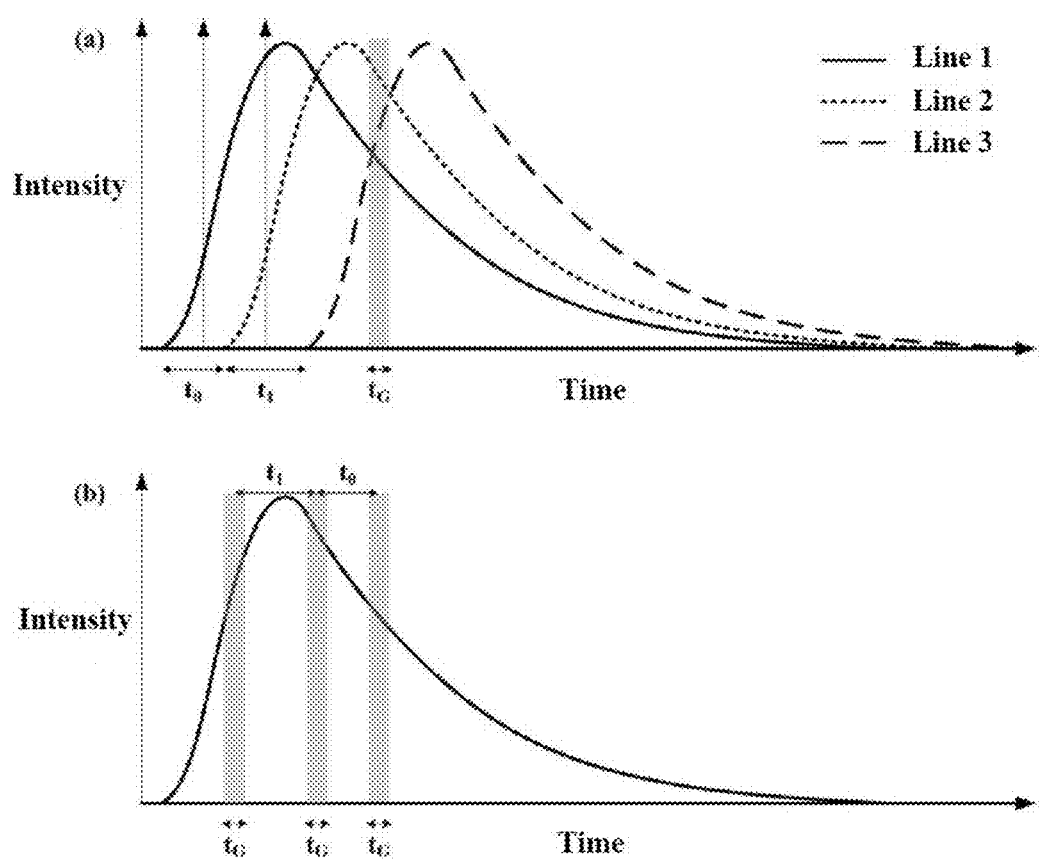
FIG. 5 is a diagram of multi-path delay gating technology according to Embodiment 1 of the present disclosure, where (a) is that a detector measures three lines in parallel in a delay window; (b) is an equivalent diagram of (a), that is, the detector detects three different delay windows of a line.

A diagram of the multi-path delay gating technology is shown in FIG. 5. $t_0$ and $t_1$ are the delays between lines 1 and 2, lines 2 and 3, respectively, and to is the width of the time-gated windows of the detector. With the multi-path delay module, the detector measures three lines in parallel, as shown in FIG. 5 (a). The detector detects the signal light of three lines in parallel in one delay window, which is equivalent to detecting three different delay windows of one line, as shown in FIG. 5 (b). In data analysis, the acquired n raw spectral signal intensities are corrected or uncorrected according to the splitting ratios of the respective lines. The correction method may be, but is not limited to, multiplying by the corresponding coefficients $1/a_1, 1/a_2, \ldots,$ and $1/a_n$, or adding other correction functions such as camera pixel response curves and fiber coupling coefficients.

In one embodiment, the time-resolved fluorescence spectrum measurement is achieved in particular with the above-mentioned time-resolved spectrum rapid measurement system, including the following steps:

(1) The laser emitted by the pulse laser module is focused on the sample stage module through various optical devices; then the signal light (such as scattered light and emitted light) is collected through the sample stage module, and the excitation light is filtered out, and finally sent to the multi-path delay module.

In one embodiment, a laser with a wavelength of 542 nm, a linewidth of 0.01 cm$^{-1}$, a pulse width of 1 ps, a repetition frequency of 80 MHz, and an average power of 400 mW is used as the fluorescence excitation light source. The laser beam passes through a 1:9 beam splitter mirror to be divided into two beams; the first beam of light with lower power is irradiated on a silicon-based detector to generate a synchronous electrical signal for time synchronization, and the other beam of light with stronger power is used for fluorescence excitation.

The sample stage used in one embodiment allows a flexible adjustment of the focus position of the samples concerning the excitation light, specifically, using a common micro fluorescence detection system.

(2) The multi-path delay module splits the signal light produced by the samples to form a plurality of optical paths, and adds a different optical distance in each optical path to extend the time for the signal light produced by the samples to reach the detector, and the time for the signal light in each optical path to reach the detector is different, to finally realize the multi-path delay.

In one embodiment, the fluorescence signal is split in three using a fiber beam splitter with $a_1=a_2=a_3=⅓$ and a multimode fiber with lengths of 2 m and 3 m added on line 2 and line 3, with delays of about 10 ns and 15 ns, respectively.

(3) The multi-path delay module is connected to the slits in the spectrometer module, each line corresponds to a different position of the slits, the interval distances can be equal or unequal, and the interval range is 1 μm to 50 mm; slit-passed signal light in all the lines spatially distinguishes the signal light of different wavelengths in each line via the same grating.

In one embodiment, a spectrometer with a standard reflective grating as the main component is used.

(4) The signal light of different wavelengths in each line produced by the grating is detected by a pixel array of the same horizontal (vertical) position of the detector module, and an interval distance of each line on the detector module is proportional to an interval distance of each line on the slits.

(5) The detector converts the detected signals into digital signals, and transmits the same to the control computer module for analysis, to finally obtain the time-resolved fluorescence spectra.

In one embodiment, the control computer module employs a desktop.

Time-resolved fluorescence spectra can be rapidly obtained by the above embodiments, and fluorescence lifetimes of samples can be rapidly obtained by numerical calculations. The method improves the acquisition speed of time-resolved fluorescence spectra and reduces the measurement error.

It will be appreciated by those skilled in the art that all or a portion of the steps in a method implementing the above embodiments may be performed by a program instructing associated hardware, and the corresponding program may be stored in a computer-readable storage medium.

It should be noted that the steps depicted in the embodiment may change order of execution. Additionally or alternatively, certain steps may be omitted, a plurality of steps may be combined to be performed as a single step, and/or a step may be decomposed be performed as a plurality of step executions.

In summary, the embodiment provides a time-resolved spectrum rapid measurement system and method. The system mainly includes pulse laser, spectrometer, multi-path delay module, detector, and other optical, mechanical, and power components commonly used in spectrum measurement systems. The multi-path delay module splits the signal light produced by the samples to form a plurality of optical paths, adds a different optical distance in each optical path to extend the time for the signal light produced by the samples to reach the detector, and the time for the signal light in each optical path to reach the detector is different, to finally realizes that the detector measures the spectra of a plurality of delay windows in parallel.

The above is only the preferred embodiment of the present disclosure, but the scope of protection of the present disclosure is not limited to this. Equivalent replacement or change, made by any skilled familiar with the technical field according to the technical solution and the disclosure idea of the present disclosure within the technical scope disclosed by the present disclosure, shall be covered by the scope of protection of the present disclosure.

The invention claimed is:

1. A time-resolved spectrum rapid measurement system, comprising:
    a pulse laser module, configured to emit pulse laser;
    a sample stage module, configured to focus the pulse laser on samples, then collect signal light produced by the samples, and filter out excitation light;
    a multi-path delay module, configured to split the signal light produced by the samples to form a plurality of optical paths;
    a spectrometer module, configured to spatially distinguish signal light of different wavelengths in each optical path, wherein the multi-path delay module is connected to slits in the spectrometer module, each optical path corresponds to a different position of the slits;
    a 2-dimensional array detector module, configured to detect spatially distinguished signal light of the plurality of optical paths in parallel; and
    a control computer module, configured to collect, store, and process the detected signal light of the plurality of optical paths to obtain time-resolved spectra, the control computer module being connected to the 2-dimensional array detector module via a data cable;
    wherein the multi-path delay module is configured to add a different optical distance in each optical path to extend the time for the signal light produced by the samples to reach the 2-dimensional array detector module, and is further configured to make the time for the signal light in each optical path to reach the 2-dimensional array detector module different, to realize multi-path delay;
    wherein each optical path is configured to form a spectral line on a pixel array aligned along a same horizontal or vertical position of the 2-dimensional array detector module, and an interval distance between adjacent spectral lines on the 2-dimensional array detector module is proportional to an interval distance between adjacent corresponding optical paths on the slits.

2. The time-resolved spectrum rapid measurement system according to claim 1, wherein performance indexes of the pulse laser are as follows:
    a wavelength range is 200 to 3000 nm, a linewidth range is 0.001 to 10000 cm$^{-1}$, a pulse width range is 10 fs to 100 ns, a repetition frequency range is 0.1 Hz to 1 GHz, and an average power range is 1 μW to 100 W.

3. The time-resolved spectrum rapid measurement system according to claim 1, wherein adding the optical distances in the optical paths comprises, but is not limited to, the use of fiber delay or free-space optical (FSO) delay; and
    modes for splitting the signal light comprise, but are not limited to, the use of fiber beam splitters or wavelength-division multiplexers.

4. The time-resolved spectrum rapid measurement system according to claim 1, wherein the time for the signal light produced from the samples to reach the 2-dimensional array detector module is in an extended range of 1 ps to 1 ms.

5. The time-resolved spectrum rapid measurement system according to claim 1, wherein if the pulse laser has a function of outputting synchronous electrical signals, the synchronous electrical signals directly trigger the 2-dimensional array detector module; otherwise, the laser is split into two beams, one beam generates synchronous electrical signals for time synchronization via a photoelectric detector, and the other beam is used for sample excitation.

6. A time-resolved spectrum rapid measurement method, comprising:

focusing pulse laser emitted by a pulse laser module on a sample stage module;

collecting, according to the pulse laser, signal light through the sample stage module, and filtering out excitation light;

splitting, through a multi-path delay module, signal light produced by samples to form a plurality of optical paths;

spatially distinguishing, through a spectrometer module, signal light of different wavelengths in each optical path, wherein the multi-path delay module is connected to slits in the spectrometer module, each optical path corresponds to a different position of the slits;

detecting, through a pixel array in a 2-dimensional array detector module, distinguished signal light of the plurality of optical paths in parallel; and collecting, storing, and processing, through a control computer module, the detected signal light of the plurality of optical paths to obtain time-resolved spectra;

wherein the multi-path delay module is configured to add a different optical distance in each optical path to extend the time for the signal light produced by the samples to reach the 2-dimensional array detector module, and is further configured to make the time for the signal light in each optical path to reach the 2-dimensional array detector module different, to realize multi-path delay;

wherein each optical path is configured to form a spectral line on a pixel array aligned along a same horizontal or vertical position of the 2-dimensional array detector module, and an interval distance between adjacent spectral lines on the 2-dimensional array detector module is proportional to an interval distance between adjacent corresponding optical paths on the slits.

7. The time-resolved spectrum rapid measurement method according to claim 6, wherein performance indexes of the pulse laser are as follows:

a wavelength range is 200 to 3000 nm, a linewidth range is 0.001 to 10000 $cm^{-1}$, a pulse width range is 10 fs to 100 ns, a repetition frequency range is 0.1 Hz to 1 GHz, and an average power range is 1 μW to 100 W.

8. The time-resolved spectrum rapid measurement method according to claim 6, wherein the multi-path delay module is connected to slits in the spectrometer module, each line corresponds to a different position of the slits, and each line is in an interval range of 1 μm to 50 mm; and slit-passed signal light in all the lines spatially distinguishes the signal light of different wavelengths in each line via a same grating.

9. The time-resolved spectrum rapid measurement method according to claim 6, wherein the time for the signal light produced by the samples to reach the 2-dimensional array detector module is in an extended range of 1 ps to 1 ms.

* * * * *